US008913268B2

(12) United States Patent
Kurihara

(10) Patent No.: US 8,913,268 B2
(45) Date of Patent: Dec. 16, 2014

(54) PRINTING APPARATUS, CONTROL METHOD FOR THE PRINTING APPARATUS, AND STORAGE MEDIUM

(75) Inventor: Shukei Kurihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 13/551,364

(22) Filed: Jul. 17, 2012

(65) Prior Publication Data

US 2013/0021619 A1 Jan. 24, 2013

(30) Foreign Application Priority Data

Jul. 20, 2011 (JP) ................................ 2011-159012

(51) Int. Cl.

| | |
|---|---|
| ***G06K 15/00*** | (2006.01) |
| ***G03G 15/00*** | (2006.01) |
| ***G03G 21/16*** | (2006.01) |
| ***G03G 15/01*** | (2006.01) |
| ***G03G 15/08*** | (2006.01) |
| *G06F 3/12* | (2006.01) |

(52) U.S. Cl.

CPC .......... *G03G 15/0173* (2013.01); *G03G 15/556* (2013.01); *G03G 21/1633* (2013.01); *G03G 2215/0116* (2013.01); *G03G 15/0865* (2013.01)

USPC ........................................ 358/1.14; 358/1.15

(58) Field of Classification Search

CPC .......... G06G 15/0173; G06G 15/0865; G06G 2215/0116

See application file for complete search history.

(56) References Cited

U.S. PATENT DOCUMENTS

| | | | | |
|---|---|---|---|---|
| 5,706,037 | A * | 1/1998 | McIntyre | 347/3 |
| 2004/0041856 | A1 * | 3/2004 | Im et al. | 347/7 |
| 2005/0196183 | A1 | 9/2005 | Taguchi | |
| 2006/0051106 | A1 | 3/2006 | Takahashi | |
| 2009/0190937 | A1 * | 7/2009 | Willis | 399/27 |
| 2011/0280593 | A1 * | 11/2011 | Kanakubo | 399/27 |

FOREIGN PATENT DOCUMENTS

| | | | |
|---|---|---|---|
| CN | 1530770 | A | 9/2004 |
| CN | 201109241 | Y | 9/2008 |
| CN | 101281384 | A | 10/2008 |
| CN | 101531091 | A | 9/2009 |
| JP | 2003-323027 | A | 11/2003 |
| JP | 2005-250196 | A | 9/2005 |
| JP | 2007-155762 | A | 6/2007 |

* cited by examiner

*Primary Examiner* — Dov Popovici

(74) *Attorney, Agent, or Firm* — Canon U.S.A., Inc. IP Division

(57) ABSTRACT

A printing apparatus configured to perform printing by using a recording material, includes a storing unit configured to store a recording material, a moving unit configured to move the storing unit determined to have run out of a recording material to a position where a recording material is supplied to the printing apparatus, and a setting unit configured to, according to an instruction from a user, set continued use of the storing unit determined to have run out of the recording material. The moving unit does not move the storing unit to the position even when the storing unit is determined to have run out of the recording material if continued use of the storing unit determined to have run out of the recording material is set.

17 Claims, 13 Drawing Sheets

FIG.6

| VARIABLES | VALUE | DESCRIPTION OF VARIABLES |
|---|---|---|
| TotalPage | 10 | VARIABLE INDICATING TOTAL NUMBER OF PAGES TO BE PRINTED |
| P | 1 | VARIABLE INDICATING PAGE NUMBER UNDER PROCESSING |
| CoverOpen | 0 | VARIABLE INDICATING WHETHER COVER HAS BEEN OPENED OR CLOSED |
| CRG_OUT[1] | 0 | TONER OUT FLAG FOR TONER CARTRIDGE 730C |
| CRG_OUT[2] | 0 | TONER OUT FLAG FOR TONER CARTRIDGE 730M |
| CRG_OUT[3] | 0 | TONER OUT FLAG FOR TONER CARTRIDGE 730Y |
| CRG_OUT[4] | 0 | TONER OUT FLAG FOR TONER CARTRIDGE 730BK |
| CRG_OVERRIDE [1] | 0 | CONTINUED USE FLAG FOR TONER CARTRIDGE 730C |
| CRG_OVERRIDE [2] | 0 | CONTINUED USE FLAG FOR TONER CARTRIDGE 730M |
| CRG_OVERRIDE [3] | 0 | CONTINUED USE FLAG FOR TONER CARTRIDGE 730Y |
| CRG_OVERRIDE [4] | 0 | CONTINUED USE FLAG FOR TONER CARTRIDGE 730BK |
| CRG_CHANGE [1] | 0 | VARIABLE INDICATING WHETHER TONER CARTRIDGE 730C HAS BEEN REPLACED |
| CRG_CHANGE [2] | 0 | VARIABLE INDICATING WHETHER TONER CARTRIDGE 730M HAS BEEN REPLACED |
| CRG_CHANGE [3] | 0 | VARIABLE INDICATING WHETHER TONER CARTRIDGE 730Y HAS BEEN REPLACED |
| CRG_CHANGE [4] | 0 | VARIABLE INDICATING WHETHER TONER CARTRIDGE 730BK HAS BEEN REPLACED |

FIG.12

| VARIABLE | VALUE | DESCRIPTION OF VARIABLES |
|---|---|---|
| CRG_PrintPage[1] | 100 | NUMBER OF PAGES PRINTED USING TONER CARTRIDGE 730C |
| CRG_PrintPage[2] | 100 | NUMBER OF PAGES PRINTED USING TONER CARTRIDGE 730M |
| CRG_PrintPage[3] | 100 | NUMBER OF PAGES PRINTED USING TONER CARTRIDGE 730Y |
| CRG_PrintPage[4] | 200 | NUMBER OF PAGES PRINTED USING TONER CARTRIDGE 730BK |
| CRG_OVERRIDEPage[1] | 0 | NUMBER OF PAGES PRINTED WHEN CONTINUED USE OF TONER CARTRIDGE 730C IS SPECIFIED |
| CRG_OVERRIDEPage[2] | 0 | NUMBER OF PAGES PRINTED WHEN CONTINUED USE OF TONER CARTRIDGE 730M IS SPECIFIED |
| CRG_OVERRIDEPage[3] | 0 | NUMBER OF PAGES PRINTED WHEN CONTINUED USE OF TONER CARTRIDGE 730Y IS SPECIFIED |
| CRG_OVERRIDEPage[4] | 150 | NUMBER OF PAGES PRINTED WHEN CONTINUED USE OF TONER CARTRIDGE 730BK IS SPECIFIED |

PRINTING APPARATUS, CONTROL METHOD FOR THE PRINTING APPARATUS, AND STORAGE MEDIUM

BACKGROUND OF THE INVENTION

1. Field of the Invention

The present invention relates to a printing apparatus including a storing unit for storing a recording material, and configured to perform printing by using the recording material.

2. Description of the Related Art

In a printing apparatus which rotates a plurality of toner cartridges, when some toner cartridge has run out of toner, this toner cartridge is moved to a position where the user can replace the toner cartridge as discussed in Japanese Patent Application Laid-Open No. 2003-323027.

To move a toner-out cartridge to a position where it can be replaced, the printing apparatus needs to detect a toner-out cartridge. For example, an optical sensor is used to detect remaining amount of toner in a toner cartridge, and when a cartridge that has run out of toner is detected, the cartridge is moved to its replacement position. Thus, the user can replace the toner cartridge smoothly.

However, if the accuracy of the optical sensor is insufficient, even if a toner cartridge in a toner-out state is detected, some amount of toner often remains in the cartridge enough to print a few pages. There may be some users who still want to use the toner until just before the printed characters are so thin and blurred.

Despite the fact that the user still wants to keep using the toner cartridge that is determined to be empty, if the user have to move the toner cartridge to the replacement position each time the printing apparatus has determined that the toner cartridge is out of recording material, this is inconvenient for users.

SUMMARY OF THE INVENTION

According to an aspect of the present invention, a printing apparatus configured to perform printing by using a recording material, includes a storing unit configured to store a recording material, a moving unit configured to move a storing unit determined to have run out of a recording material to a position where a recording material is supplied to the printing apparatus, and a setting unit configured to, according to an instruction from a user, set continued use of the storing unit determined to have run out of the recording material, wherein the moving unit does not move the storing unit to the position even when the storing unit is determined to have run out of the recording material if continued use of the storing unit determined to have run out of the recording material is set.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a diagram illustrating an example of a work area for managing variables.

FIG. 12 is a diagram illustrating an example of a work area for managing variables used in a fourth embodiment of the present invention.

DESCRIPTION OF THE EMBODIMENTS

Various exemplary embodiments, features, and aspects of the invention will be described in detail below with reference to the drawings.

Figure 1:
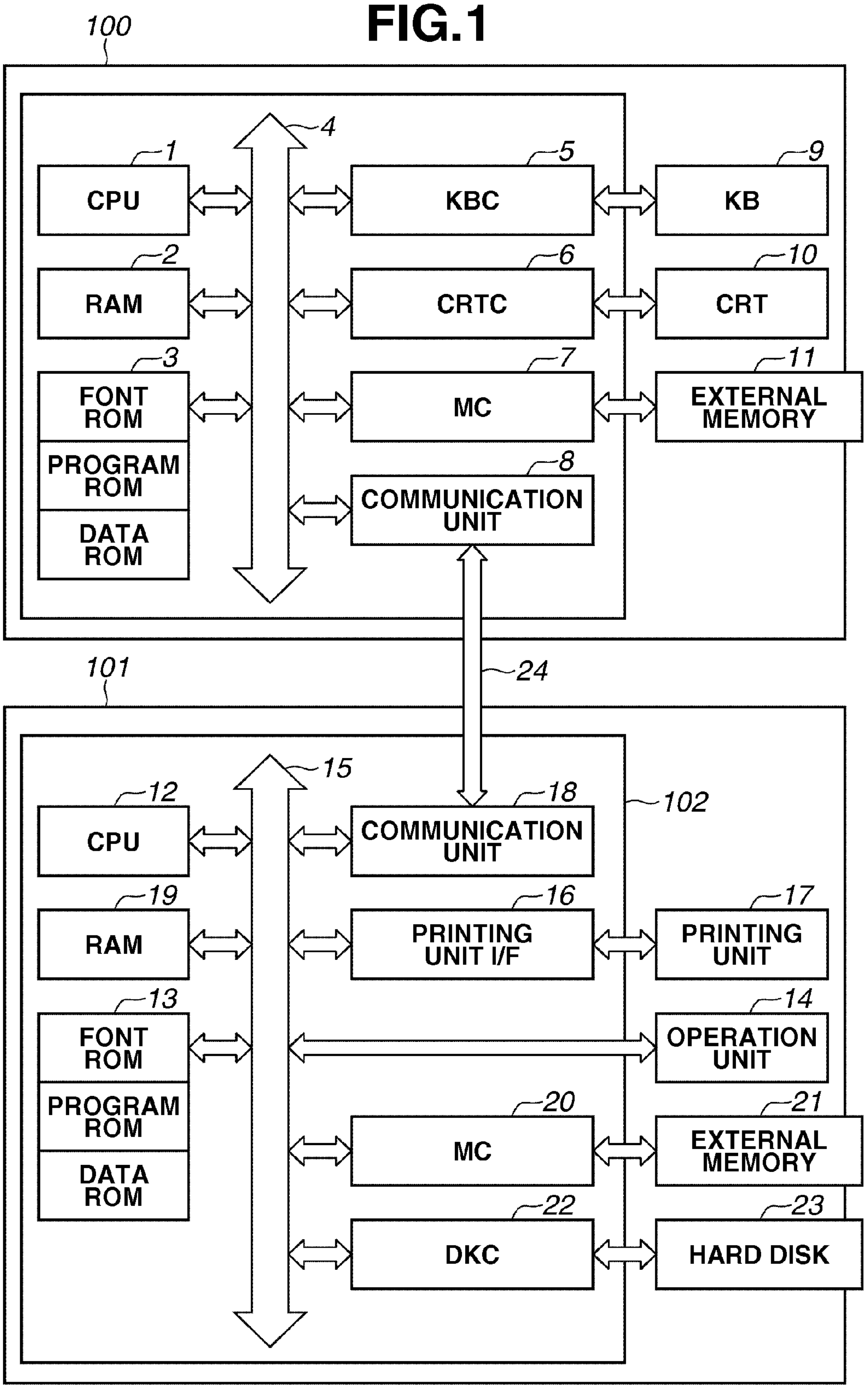
FIG. 1 is a block diagram illustrating a printing system according to a first exemplary embodiment of the present invention.

FIG. 1 is a block diagram illustrating a printing system according to an exemplary embodiment of the present in invention. In this printing system, a computer 100 communicates with a printing apparatus 101 through a bidirectional interface 24. The bidirectional interface 24 may be a wired interface, such as LAN or USB, or a wireless LAN.

The computer 100 includes a central processing unit (CPU) 1, a random access memory (RAM) 2, a read only memory (ROM) 3, a system bus 4, a keyboard controller 5, a cathode ray tube (CRT) controller 6, a memory controller 7, a communication unit 8, a keyboard 9, a CRT display 10, and an external memory 11.

The CPU 1 performs various kinds of data processing based on programs stored in a program ROM. The CPU 1 processes documents including graphics, images, characters, tables (such as spreadsheets) or mixtures of them. The CPU 1 collectively controls devices connected to the system bus 4. Moreover, the CPU 1 develops outline fonts in a RAM for display information, set on the RAM 2, and realizes WYSIWYG (What You See Is What You Get). The CPU 1 also opens various kinds of windows and executes various kinds of data processing on commands issued by the mouse cursor on the CRT display unit 10.

The RAM 2 serves as a main memory or a work memory of the CPU 1. The ROM 3 includes a font ROM, a program ROM, and a data ROM. The font ROM stores font data used in document processing. The program ROM stores not only a control program for controlling the computer 100 but also stores programs such as a printer selector and a network printer driver. The data ROM stores various kinds of data used in document processing.

The keyboard controller 5 controls key-in operations from the keyboard 9 and a pointing device (not illustrated). The CRT controller 6 controls display on the CRT display unit 10.

The memory controller 7 controls access to the external memory 11. The external memory 11 is a memory device to store a boot program, application programs, font data, user files, and edition files. The external memory 11 may be a hard disk, a flash EEPROM memory or a USB memory.

The communication unit 8 controls communication with the printing apparatus 101 through the bidirectional interface 24.

The printing apparatus 101 includes a printer controller 102, the operation unit 14, the printing unit 17, the external memory 21, and the hard disk 23. The printer controller 102 includes a CPU 12, a ROM 13, a system bus 15, a printing unit interface 16, a communication unit 18, a RAM 19, a memory controller 20, and a disk controller 22.

The CPU 12 executes a control program stored in the program ROM and a control program stored in the external memory 21 to perform data processing. In addition, the CPU 12, based on the control program, collectively controls various devices connected to the system bus 15. For example, the CPU 12 generates image data and transmits an image signal based on the image data to the printing unit 17 through the printing unit interface 16.

The CPU 12 transmits a control signal to the printing unit 17 through the printing unit interface 16. In addition, the CPU 12 transmits information about the printing apparatus 101 to the computer 100 through the communication unit 18.

The ROM 13 includes the font ROM, the program ROM, and the data ROM. The font ROM stores font data used to generate image data. The program ROM stores a control program which is executed by the CPU 12. The data ROM stores various kinds of data to be used in data processing, for example.

The operation unit 14 is an operation panel including switches and LED displays to display the key input and information. The operation unit 14 may be formed by a touch panel.

The printing unit interface 16 controls communication with the printing unit 17. The communication unit 18 controls communication with the computer 100 performed through the bidirectional interface 24.

The RAM 19 serves as the main memory and the work memory of the CPU 12. The memory capacity of the RAM 19 can be expanded by adding an optional RAM to an expansion port (not illustrated). The RAM 19 can also serve as an image data memory area to store rasterized image data or an environment data memory area to store environment data or a nonvolatile RAM (NVRAM) to store various kinds of parameters.

The memory controller 20 controls access to the external memory 21. The external memory 21, such as an IC card or a USB memory, can store font data, an emulation program, and form data.

The disk controller 22 controls access to the hard disk 23. The hard disk 23 stores print data and a control program, for example.

Figure 2:
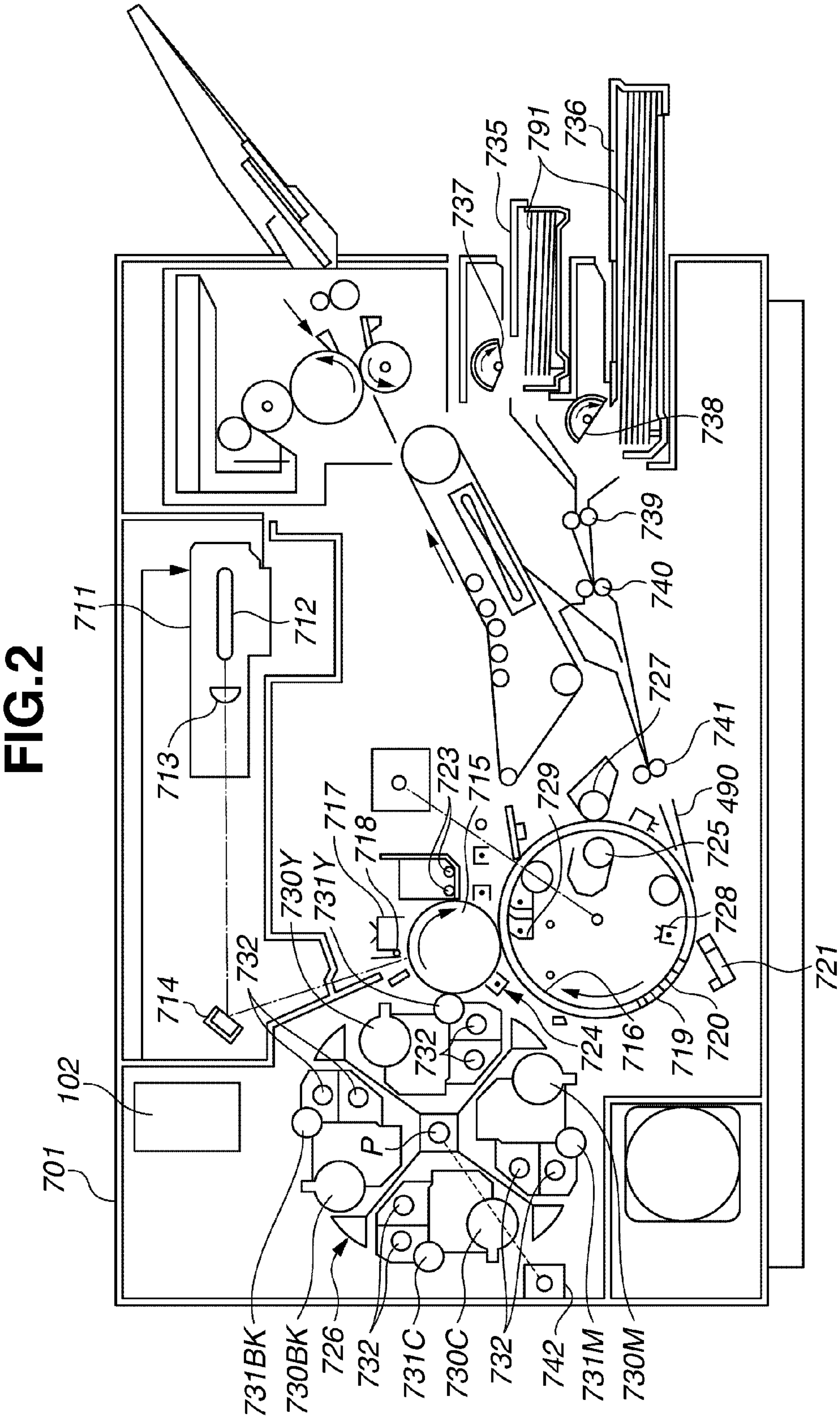
FIG. 2 is a sectional view of a printing apparatus.

FIG. 2 is a sectional view of the printing apparatus 101. FIG. 2 illustrates an internal structure of a color laser printer of a rotary development system. In the present exemplary embodiment, toner is used as a recording material for printing.

A scanner 711 includes a laser output unit (not illustrated) configured to convert an image signal from the printer controller 102 into a light signal (laser light), an octahedral polygon mirror 712, a motor (not illustrated) to rotate the polygon mirror 712, and an f/θ lens (imaging lens) 713.

The laser beam emitted from the laser output unit is reflected from a side face of the polygon mirror 712, passes through the f/θ lens 713 and the reflection mirror 714, and thus scans the surface of photosensitive drum 715 linearly (raster scan). The photosensitive drum 715 rotates in the arrow direction as illustrated in FIG. 2.

In this manner, an electrostatic latent image corresponding to an image represented by an image signal is formed on the surface of the photosensitive drum 715. Around the photosensitive drum 715, there are arranged a primary charging unit 717, a whole surface exposure lamp 718, a cleaner unit 723 to collect the toner not transferred to a paper (residual toner), and a pre-exposure charger 724.

A developing unit 726 is a unit to develop the electrostatic latent image formed on the surface of the photosensitive drum 715. The developing unit 726 includes the following units. The toner cartridges 730C, 730M, 730Y, and 730BK each hold toner as developer. A toner remaining amount sensor (not illustrated) is used to measure remaining toner amount of each toner cartridge.

Development sleeves 731C, 731M, 731Y, and 731BK are respectively brought into contact with the photosensitive drum 715 to develop the latent images into visible images by the developer. Screws 732 convey the developers from the toner cartridges 730C, 730M, 730Y, and 730BK respectively to the development sleeves 731C, 731M, 731Y, and 731BK. In other words, developers for cyan, magenta, yellow, and black are used to form toner images on the photosensitive drum 715.

The toner cartridges, the development sleeves, and the screws are disposed around the central axis P. The symbols attached to the components Y, M, C and BK represent different colors. More specifically, C is cyan, M is magenta, Y is yellow, and BK is black.

A cover 701 can be opened or closed. The user can open the cover 701 and replace the toner cartridges. The toner cartridge directly below the cover 701 can be dismounted. The position directly below the cover 701 is referred to as a position for replacing toner cartridges. In FIG. 2, the toner cartridge 730BK is at the replacement position. Since the toner cartridges 730Y, 730M, 730C, and 730BK are rotated about the axis P, the toner cartridges move to the replacement position where they can be replaced.

A position sensor 742 detects the rotational position of a developing unit 726. When a toner image of yellow is formed on the photosensitive drum 715, the developing unit 726 is rotated about the axis P by a motor (not illustrated), and the photosensitive drum 715 and the developing sleeve 731Y are brought into contact with each other.

FIG. 2 illustrates how the above-described operation is performed. To form a toner image of magenta, the developing unit 726 is rotated about the axis P by the motor, and the photosensitive drum 715 and the development sleeve 731M are brought into contact with each other. This operation is similarly performed when toner images of cyan and black are formed.

The transfer drum 716 transfers the toner image formed on the photosensitive drum 715 onto a paper sheet. The actuator plate 719 detects the position of the transfer drum 716 moved as a result of its movement. The position sensor 720 detects, by approaching the actuator plate 719, a fact that the transfer drum 716 has reached the home position.

There are provided the actuator plate 719, the position sensor 720, a transfer drum cleaner unit 725, a paper pressing roller 727, a static eliminator 728, a transfer charging unit 729, and the transfer drum 716 around the transfer drum 716.

The sheet cassettes 735 and 736 contain sheets of paper 791. For example, the sheet cassette 735 contains A4-size sheets and the sheet cassette 736 contains A3-size sheets. When a sheet of paper is fed and conveyed, a paper roller 737 or 738 feeds a sheet of paper from the sheet cassette 735 or 736.

Timing rollers 739, 740, and 741 are configured to control timing to supply or convey a sheet of paper. The sheet of paper passes through the timing rollers 739, 740, and 741, and is guided by a paper guide 490. Then, the paper sheet is wound around the transfer drum 716 with the leading end supported by the gripper 721. Whether the sheet cassette 735 or 736 is selected is determined by a command from the printer controller 102. Only the paper roller, which corresponds to the selected sheet cassette, is rotated.

By the arrangement described above, full color (C, M, Y, and BK) printing is performed.

Figure 3:
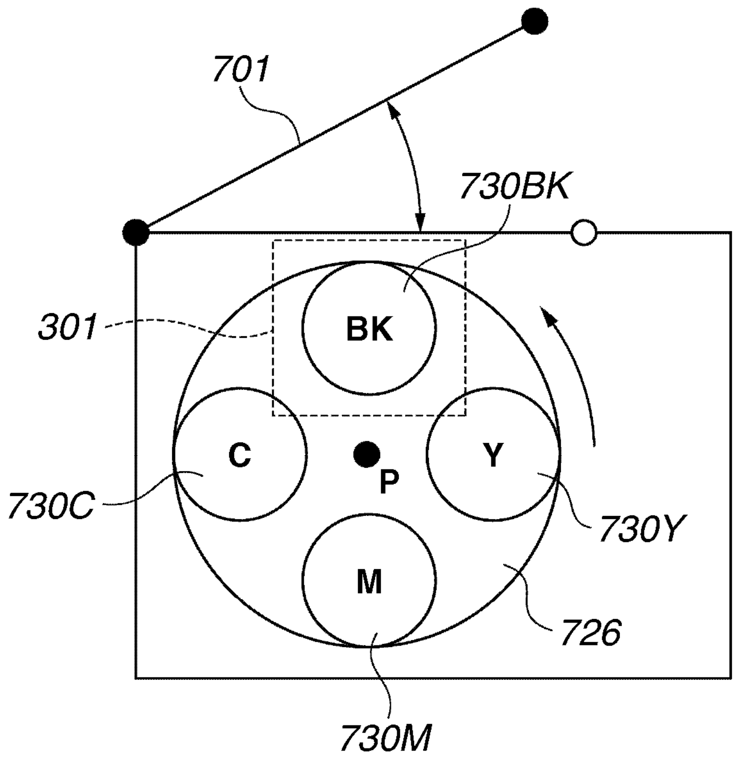
FIG. 3 is a diagram illustrating how the toner cartridge is replaced in a color laser printer with a rotary developing unit.

FIG. 3 is a diagram illustrating how the toner cartridge is replaced in a laser printer with a rotary developing unit illustrated in FIG. 2. When the user wants to replace the toner cartridge, the user opens the cover 701.

The position directly below the opened cover 701 is the replacement position 301 for replacing a toner cartridge. The user can change the toner cartridge at the replacement position 301. In the example of FIG. 3, the toner cartridge 730BK can be replaced. However, the toner cartridge replacement position is not limited to the one illustrated in FIG. 3, but may be different according to the structure of the printing apparatus.

The motor rotates the developing unit 726 according to a control signal from the printer controller 102 to move any one of cartridges to the replacement position 301.

Figure 4:
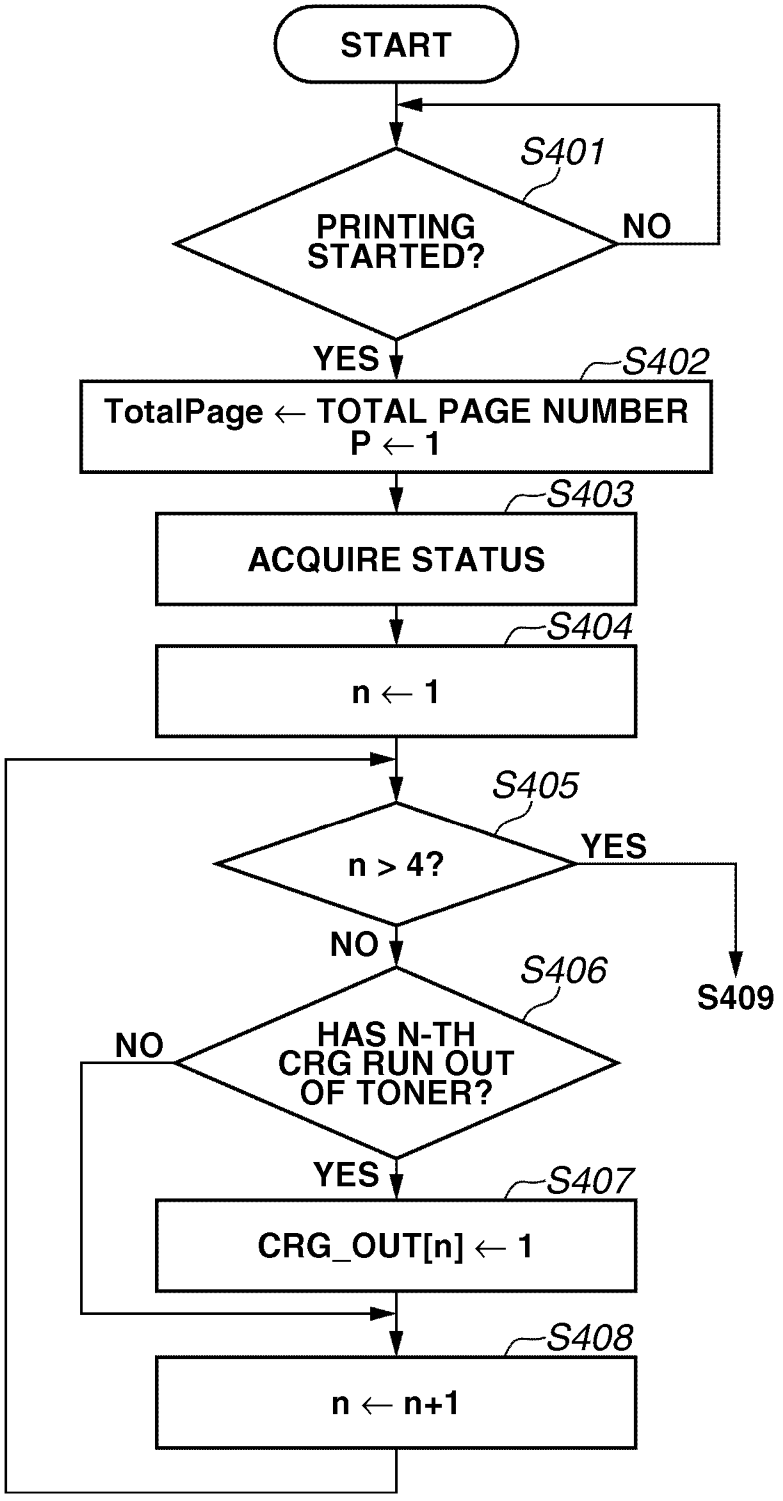
FIG. 4 is a flowchart illustrating a control method according to the first exemplary embodiment of the present invention.
Figure 5:
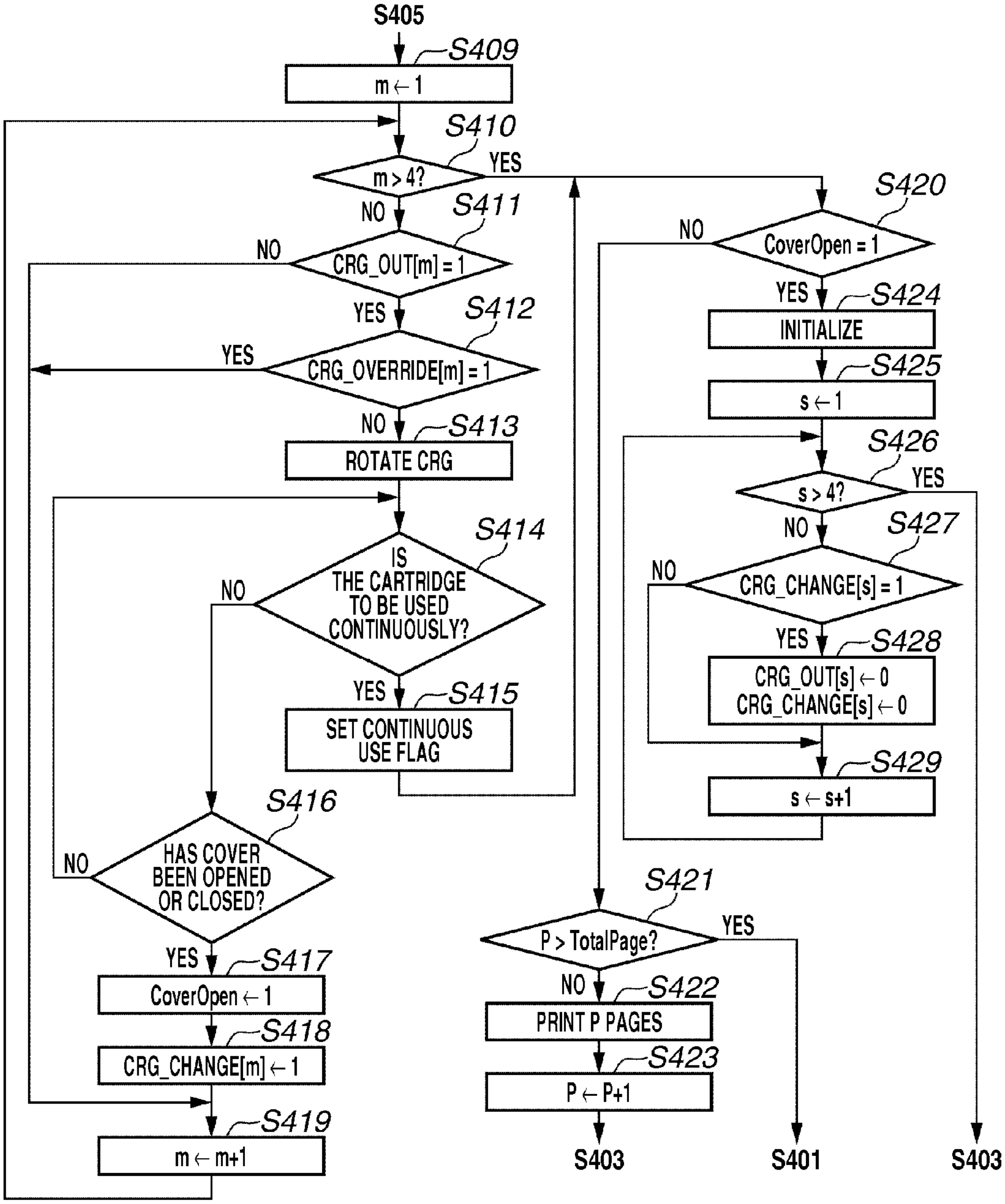
FIG. 5 is a flowchart illustrating a control method according to the first exemplary embodiment of the present invention.

A control method for the printing apparatus according to the present invention will be described. FIGS. 4 and 5 are flowcharts illustrating a control method according to an exemplary embodiment of the present invention. The control method is performed when the CPU 12 executes a program, which is stored in the ROM 13 and based on the flowcharts in FIGS. 4 and 5.

In step S401, the CPU 12 determines whether to start printing. When the communication unit 18 receives print data from the computer 100, the CPU 12 determines that printing is to be started. A case where print data is received from the computer 100 will be described below.

When print data has been received, in step S402, the CPU 12 sets a variable TotalPage to a total page number of print data, and sets a variable P to 1.

FIG. 6 illustrates an example of a work area to manage variables to be used in the control method. The values of the variables are stored in the RAM 19.

The variable TotalPage indicates a total number of pages to be printed. The P denotes a page number under processing. The variable CoverOpen indicates whether the cover 701 has been opened or closed. If the cover 701 has not been opened or closed, 0 (zero) is set. If the cover 701 has been opened or closed, 1 is set. The initial value (default) is 0.

A variable CRG_OUT serves as a toner-out flag for each toner cartridge. If a toner cartridge is not determined as toner-out, the toner-out flag is set to 0. When the toner cartridge is determined as toner-out, the flag is set to 1. The default value is 0.

A variable CRG_OVERRIDE serves as a continued use flag for each toner cartridge. The continued use means that even when a toner cartridge has been determined as toner out, the user selects continued use.

Even when a remaining toner amount sensor detects that the toner cartridge is empty, there may be cases where some toner remains in the toner cartridge. In such a case, the user can still use that small amount of toner by "continued use." If the user does not select continued use, 0 is set in the above variable. If the user selects continued use, 1 is set. The default value is 0.

A variable CRG_CHANGE indicates whether each toner cartridge has been replaced. If the toner cartridge has not been replaced, 0 is set. If the toner cartridge has been replaced, 1 is set. The default value is 0.

In step S403, the CPU 12 acquires status information from the printing unit 17. The status information includes CRG status indicating the remaining amount of toner in each toner cartridge. The CPU 12 can detect a toner low state and a toner-out state based on the CRG status.

In step S404, the CPU 12 sets the variable n to 1. In step S405, the CPU 12 determines whether the value of the variable is larger than 4. If the variable n is equal to or smaller than 4 (NO in step S405), in step S406, the CPU 12 determines whether the n-th toner cartridge is out of toner, according to the status information acquired in step S403. In the example of FIG. 4, the toner cartridge 730C is the first one, the toner cartridge 730M is the second one, the toner cartridge 730Y is the third one, and the toner cartridge 730BK is the fourth one.

If the n-th toner cartridge is in the toner out state, in step S407, the CPU 12 sets the variable CRG_OUT [n] to 1. In step S408, the CPU 12 increments the variable n by 1, and the processing proceeds to step S405.

If the variable n is larger than 4 (YES in step S405), in step S409, the CPU 12 sets a variable m to 1. In step S410, the CPU 12 determines whether the value of the variable m is larger than 4. If the variable m is equal to or smaller than 4 (NO in step S410), in step S411, the CPU 12 determines whether the value of CRG_OUT[m] is 1 or not. In other words, the CPU 12 determines whether the m-th toner cartridge has been determined as toner-out.

If CRG_OUT [m] is 1 (YES in step S411), in step S412, the CPU 12 determines whether the value of CRG_OVERRIDE [m] is 1. In other words, the CPU determines whether continued use of the m-th toner cartridge has already been selected. If the value of CRG_OVERRIDE [m] is 1 (YES in step S412), the m-th toner cartridge is not replaced. Therefore, the m-th toner cartridge is not moved to the replacement position.

If the value of CRG_OVERRIDE [m] is not 1 (NO in step S412), in step S413, the CPU 12 instructs the printing unit 17 to move the m-th toner cartridge to the replacement position. In response to this instruction, the motor in the printing unit 17 moves the m-th toner cartridge to the replacement position.

In step S413, the CPU 12 displays a message on the operation unit prompting that the m-th toner cartridge should be replaced with a new one. Alternatively, through the communication unit 18, the CPU 12 sends to the computer 100 status information notifying that the m-th toner cartridge is out of toner. The computer 100 displays on the display unit 10 a message indicating that the m-th toner cartridge needs to be replaced.

Figure 7:
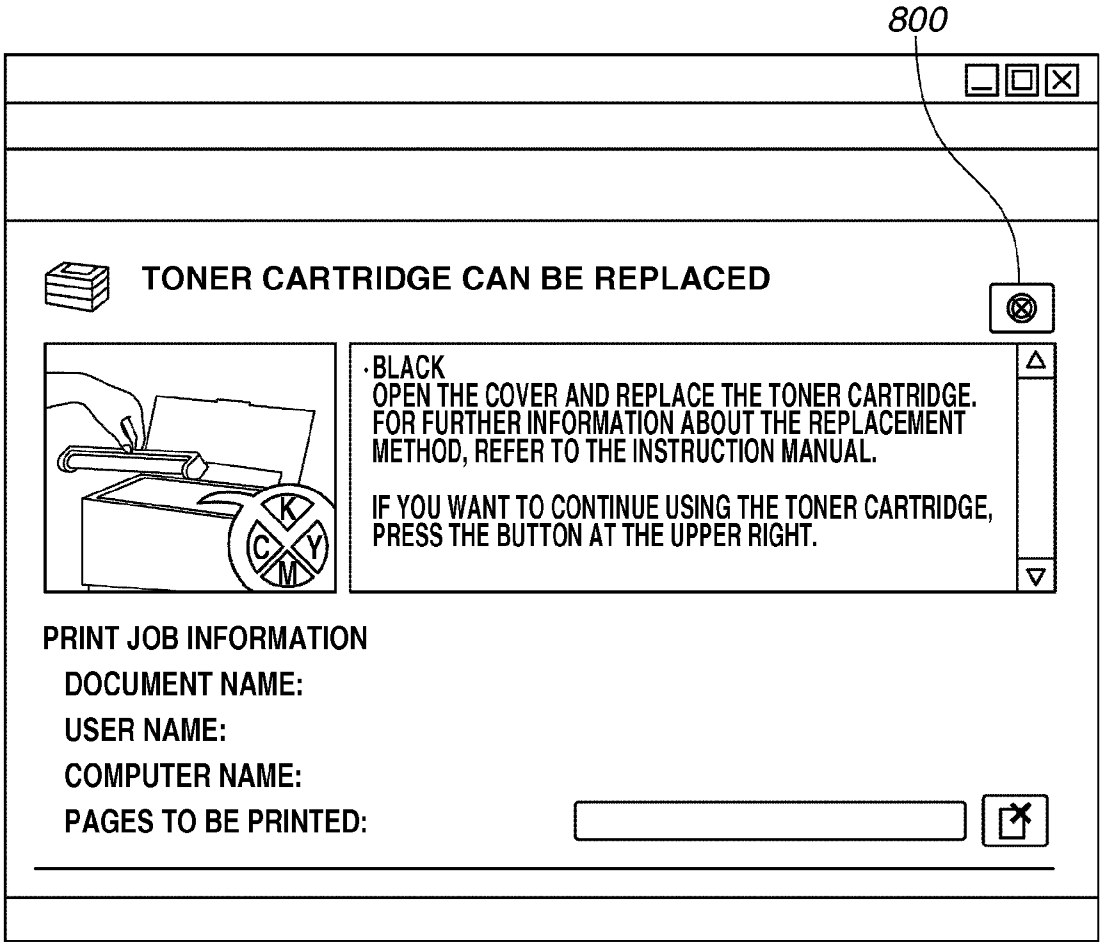
FIG. 7 is a diagram illustrating an example of messages displayed on an operation unit or a CRT display unit.

FIG. 7 is an example message displayed on an operation unit 14 or a CRT display unit 10. In the example of FIG. 7, a message is displayed indicating that a toner cartridge of black needs to be replaced. The message may inform that the toner cartridge has run out of toner.

Together with the display of a message about necessity of toner cartridge replacement, the operation unit 14 or the CRT display unit 10 displays a button 800 for the user to instruct the continued use of the toner cartridge. The computer 100 notifies the printing apparatus 101 whether the button 800 has been pressed.

There may be cases where printed characters or graphics may be too thin and blurred even though the toner cartridge is used continuously, because the toner remains little or has been consumed complexly. Therefore, the printing apparatus 101 inquires the user if the user is still to make continued use of the toner cartridge.

In step S414, the CPU 12 determines whether the button 800 provided to select continued use has been pressed. If the button 800 has been pressed (YES in step S414), in step S415, the CPU 12 sets CRG_OVERRIDE to 1 for each of one or more toner cartridges whose CRG_OUT is 1. For example, when CRG_OUT[1] and CRG_OUT[4] are 1, CRG_OVERRRIDE[1] and CRG_OVRERRIDE[4] are set to 1.

In the example of FIG. 5, the user, by a single operation, can select continued use of two or more toner cartridges which have become toner out at the same time. However, the user may separately set continued use for each of two or more toner cartridges that have become toner out at the same time. In this case, after step S415, the processing proceeds to step S419.

If the button 800 is not pressed (NO in step S414), in step S416, the CPU 12 determines whether the cover 701 has been opened or closed. If the cover 701 has been opened or closed (YES in step S416), in step S417, the CPU 12 sets the variable CoverOpen to 1 and, in step S418, sets CRG_CHANGE [m] to 1. In the present exemplary embodiment, by detecting the cover 701 being opened or closed, the CPU 12 determines that the toner cartridge has been changed.

In step S419, the CPU 12 increments the value of the variable m by 1, and the processing proceeds to step S410.

If the variable m is larger than 4 (YES in step S410), in step S420, the CPU 12 determines whether the variable CoverOpen is 1.

If the variable CoverOpen is not 1 (NO in step S420), in step S421, the CPU 12 determines whether the value of the variable P is larger than the value of the variable TotalPage. If the value of the variable P is larger than the value of the variable TotalPage (YES in step S421), this means that all pages have been printed, and the processing proceeds to step S401.

If the value of the variable P is equal to or smaller than the value of the variable TotalPage (NO in step S421), the CPU 12 sends to the printing unit 17 image data of a page number represented by the variable P, in step S422, and the printing unit 17 prints a page of the page number represented by the variable P. In step S423, the CPU 12 increments the variable P by 1 and the processing proceeds to step S403.

If the value of the variable CoverOpen is 1 (YES in step S420), in step S424, the CPU 12 instructs the printing unit 17 to perform initialization processing to enable the newly-installed toner cartridge to be used. In step S424, the CPU 12 sets the variable CoverOpen to 0.

In step S425, the CPU 12 sets a variable s to 1. In step S426, the CPU 12 determines whether the value s is larger than 4. If the value of the variable s is larger than 4 (YES in step S426), the processing proceeds to step S402. If the value of the variable s equal to of smaller than 4 (No in step S426), in step S427, the CPU 12 determines whether the value of CRG_CHANGE[s] is 1.

If the value of CRG_CHANGE [s] is 1 (YES in step S427), in step S428, the CPU 12 sets CRG_OUT[s] to 0, and sets CRG_CHANGE[s] to 0.

In step S429, the CPU 12 increments the variable s by 1 and the processing proceeds to step S426.

According to the control method illustrated in FIGS. 4 and 5, the toner cartridge specified for continued use is not to be a target of replacement thereafter, and the toner cartridge is not to be moved to the replacement position in step S413.

Figure 8:
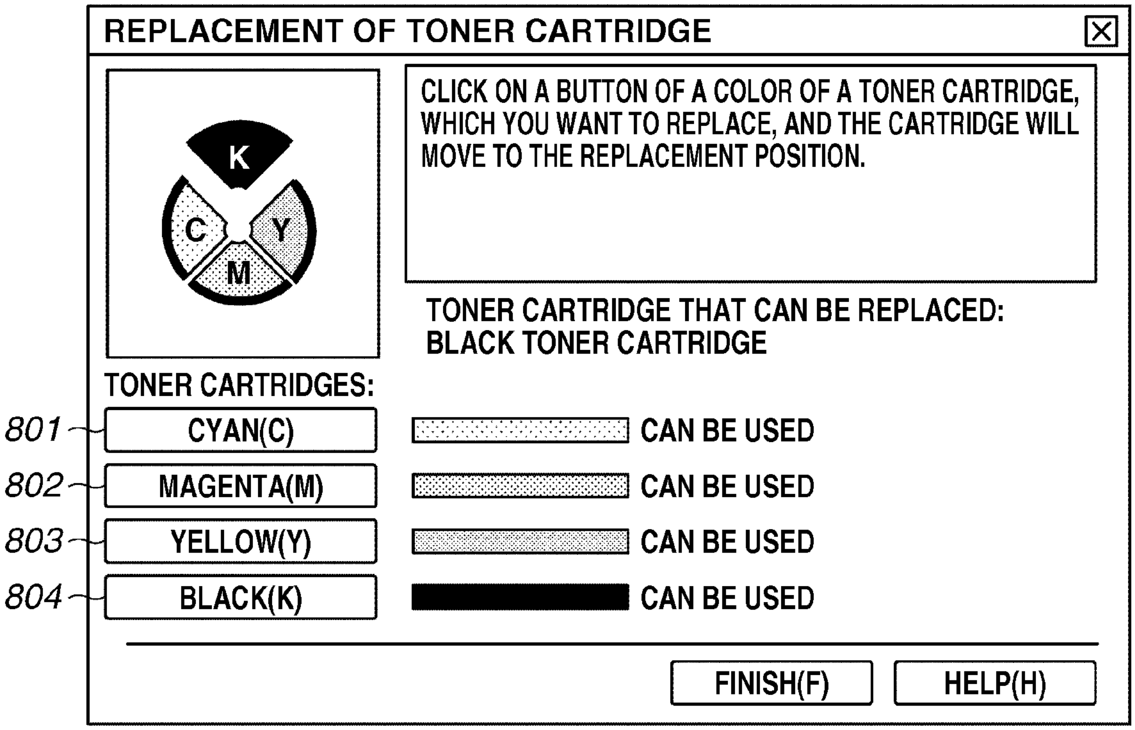
FIG. 8 is a diagram illustrating an example of an operation screen displayed on the operation unit or the CRT display unit.

When the user intends to replace the toner cartridge specified for continued use, the user have to separately issue an instruction to replace the toner cartridge. FIG. 8 illustrates an example of an operation screen displayed on the operation unit 14 or the CRT display unit 10. From among the buttons 801 to 804, the user presses a button corresponding to a toner cartridge the user intends to replace.

When the user presses a button on the operation screen displayed on the CRT display unit 10, the computer 100 notifies the printing apparatus 101 of an instruction to replace a toner cartridge and the toner cartridge selected by the user.

The CPU 12 instructs the printing unit 17 to move the toner cartridge selected by the user to the replacement position. In response to the instruction, the motor in the printing unit 17 moves the toner cartridge selected by the user to the replacement position. Then, the CPU 12 determines whether the cover 701 has been opened or closed. If the cover 701 has been opened or closed, the CPU 12 sets CRG_OUT corresponding to the toner cartridge selected by the user to 0. Then, the CPU 12 sets CRG_OVERRIDE corresponding to the toner cartridge selected by the user to 0.

In the exemplary embodiment in FIG. 5, the toner cartridge specified for continued use is not to be a target of replacement thereafter, and is not to be moved to the replacement position in step S413. However, there may be some users who want to replace the toner cartridge specified for continued use at a timing when another toner cartridge runs out of toner, together therewith.

For this reason, according to a second exemplary embodiment of the present invention, a user can previously select whether to move the toner cartridge specified for continued use to the replacement position when another toner cartridge runs out of toner.

Figure 9:
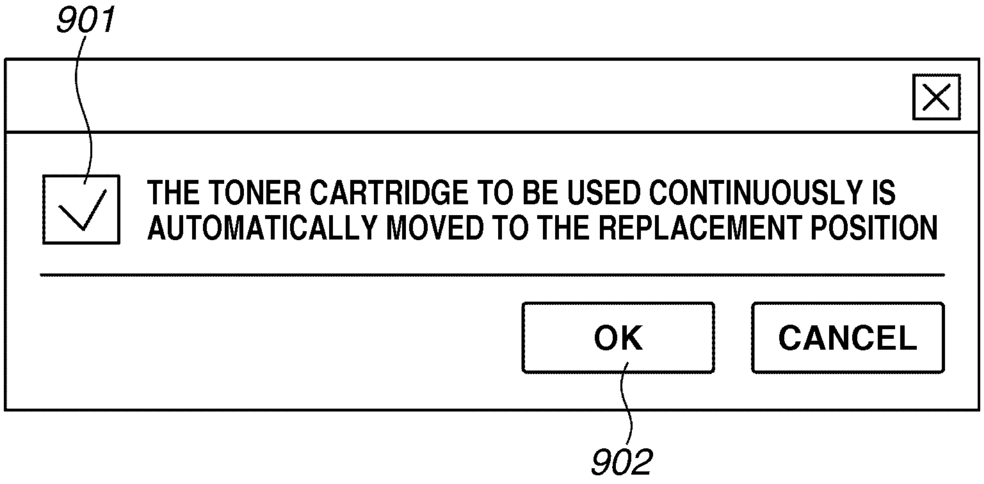
FIG. 9 is a diagram illustrating an example of the operation screen displayed on the operation unit or the CRT display unit.

FIG. 9 illustrates an example of an operation screen displayed on the operation unit 14 or the CRT display unit 10. When the user desires that the toner cartridge specified for continued use should be moved to the replacement position in a case where another toner cartridge runs out of toner, the user ticks a check box 901 and presses an OK button 902. If the user desires that the toner cartridge specified for continued use should not be moved to the replacement position, the user presses the OK button 902 without ticking the check box 901.

The CPU 12 sets the variable AUTO to 1 when a check mark is input in the check box 901, and sets the variable AUTO to 0 when a check mark is not input in the Check box 901. The value of the variable AUTO is stored in the external memory 21 or the hard disk 23.

Figure 10:
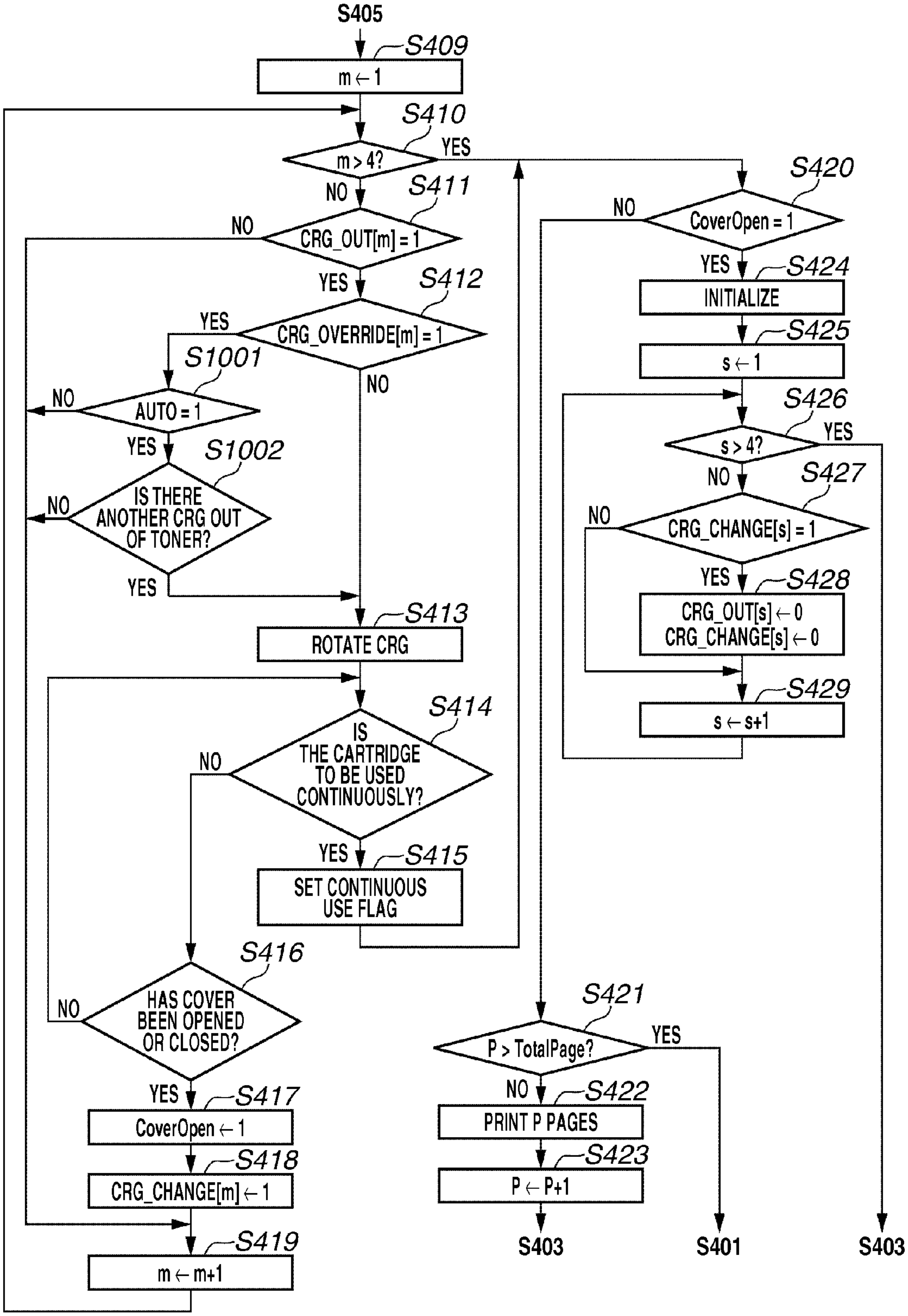
FIG. 10 is a flowchart illustrating a control method according to a second embodiment of the present invention.

FIG. 10 is a flowchart illustrating a control method according to the second exemplary embodiment. This control method is performed when the CPU 12 executes a program, which is stored in the ROM 13 and based on the flowchart in FIG. 10. In FIG. 10, steps S1001 and S1002 are newly added. The flowchart in FIG. 10 will be described focusing on differences from the flowchart in FIG. 4.

In step S412, the CPU 12 determines whether the value of CRG_OVERRIDE [m] is 1. If the value of CRG_OVERRIDE is 1 (YES in step S412), in step S1001, the CPU 12 determines whether the value of the variable AUTO is 1.

If the value of the variable AUTO is 1, the CPU 12 refers to CRG_OUT[1] through CRG_OUT[4], and CRG_OVERRIDE[1] through CRG_OVERRIDE[4]. In step S1002, the CPU 12 determines whether there is another toner cartridge including CRG_OUT having the value of 1 and CRG_OVER- RIDE having the value of 0. If there is another toner cartridge (YES in step S1002), in step S413, the CPU 12 moves the m-th toner cartridge to the replacement position.

According to the second exemplary embodiment, the user can select whether to move the toner cartridge specified for continued use to the replacement position when another toner cartridge runs out of toner.

According to the second exemplary embodiment, it is determined whether to move the toner cartridge specified for continued use to the replacement position when another toner cartridge runs out of toner. In a third exemplary embodiment of the present invention, it is determined whether to move the toner cartridge specified for continued use to the replacement position when another toner cartridge is replaced.

Figure 11:
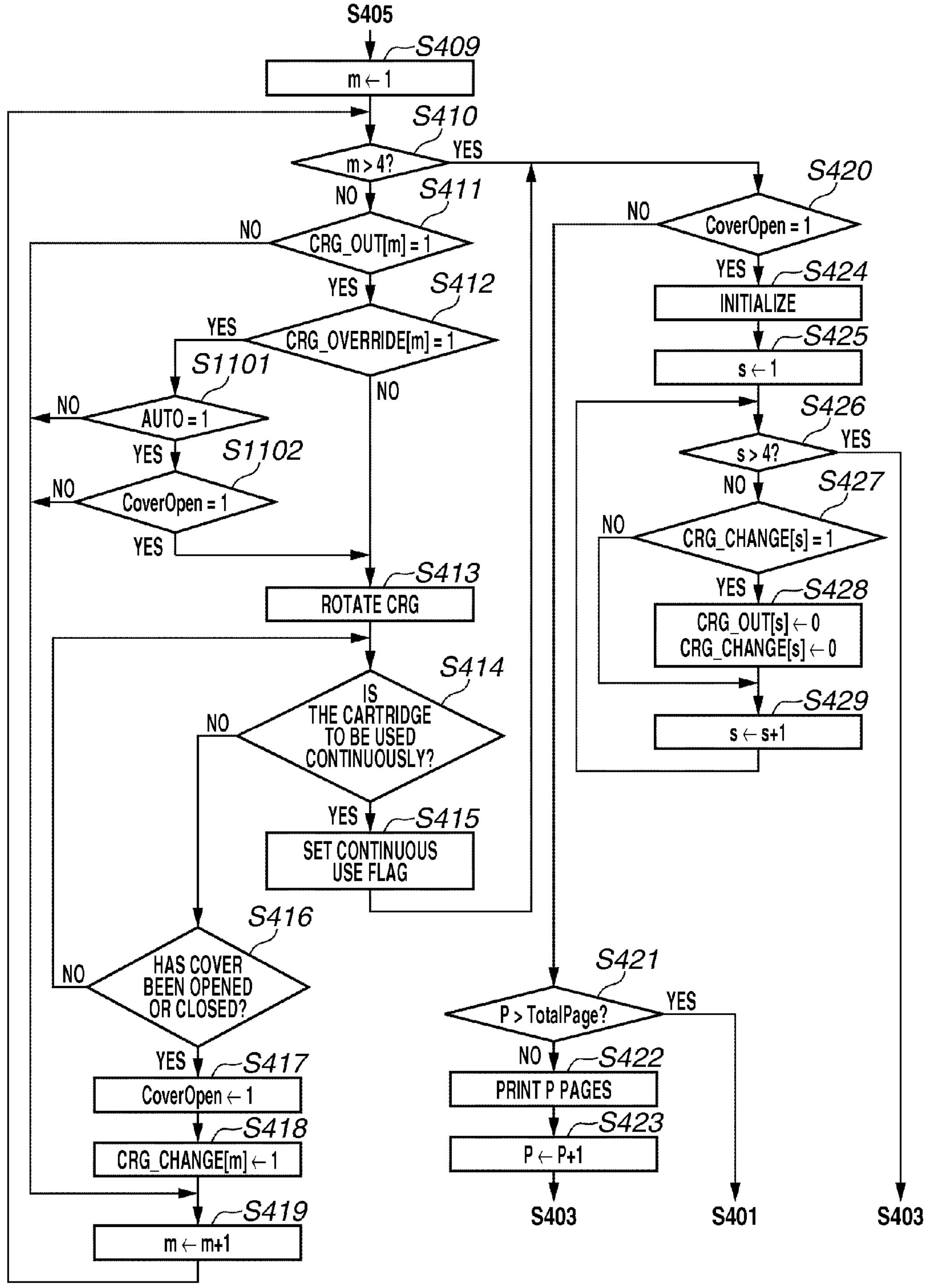
FIG. 11 is a flowchart illustrating a control method according to a third embodiment of the present invention.

FIG. 11 is a flowchart illustrating a control method according to the third exemplary embodiment. This control method is implemented when the CPU 12 executes a program, which is stored in the ROM 13 and based on the flowchart in FIG. 11. In FIG. 11, steps S1101 and S1102 are added. The flowchart in FIG. 11 will be described focusing on differences from the flowchart in FIG. 4.

In step S412, the CPU 12 determines whether the value of CRG_OVERRIDE[m] is 1. If the value of CRG_OVERRIDE [m] is 1 (YES in step S412), in step S1101, the CPU 12 determines whether the value of the variable AUTO is 1.

If the value of the variable AUTO is 1 (YES in step S1101), in step S1102, the CPU 12 determines whether the value of the variable CoverOpen is 1. If the value of the variable CoverOpen is 1 (YES in step S1102), in step S413, the CPU 12 moves the m-th toner cartridge to the replacement position.

According to the third exemplary embodiment, the user can select whether to move the toner cartridge specified for continued use to the replacement position when another toner cartridge is replaced.

According to a fourth exemplary embodiment, after continued use of a toner cartridge is specified and then a predetermined number of pages are printed, a toner cartridge specified for continued use is moved to the replacement position. In the fourth exemplary embodiment, two variables are provided, namely, a variable CRG_PrintPage representing a number of pages printed by using toner cartridges and a variable CRG_OVERRIDEPage representing a number of pages when continued use of a toner cartridge is specified.

FIG. 12 is a diagram illustrating an example of a work area in which variables used in the fourth exemplary embodiment are managed. Those values of the variables are stored in the external memory 21 or the hard disk 23. In the example of FIG. 12, the number of pages printed by using the toner cartridge 730C is 100. The number of pages printed by using the toner cartridge 730BK is 200. When the number of pages printed by the toner cartridge 730BK was 150, continued use of the toner cartridge 730BK was specified.

Figure 13:
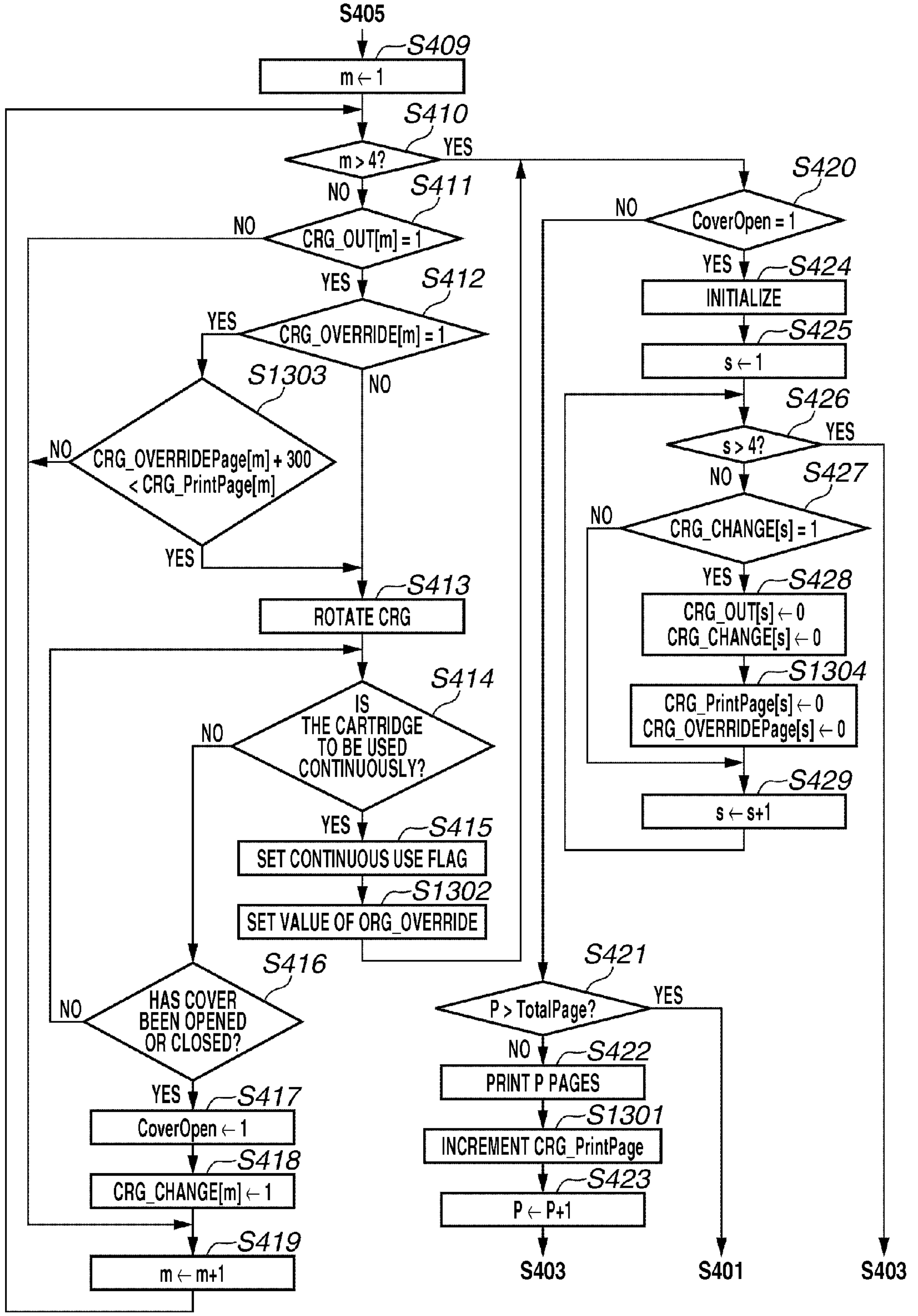
FIG. 13 is a flowchart illustrating a control method according to the fourth embodiment of the present invention.

FIG. 13 is a flowchart illustrating a control method according to the fourth exemplary embodiment. The control method is implemented when the CPU 12 executes a program, which is stored in the ROM 13 and based on the flowchart of FIG. 13. In FIG. 13, steps S1301 through S1304 are added. The flowchart in FIG. 13 will be described focusing on differences from the flowchart in FIG. 4.

After executing step S422, in step S1301, the CPU 12 increments by 1 the value of CRG_PrintPage corresponding to one or more toner cartridges used in printing in step S422. For example, when the toner cartridge 730BK is used, the CPU increments the value of CRG_PrintPage[4] by 1.

After executing step S415, in step S1302, the CPU 12 sets the value of CRG_PrintPage into CRG_OVERRIDEPage with regard to one or more toner cartridges which has been set in step S415. For example, when continued use of the toner cartridge of cyan and the toner cartridge of black is specified, the CPU 12 sets the value of CRG_PrintPage [1]_into CRG_OVERRIDEPage [1]. Furthermore, the CPU 12 sets the value of CRG_PrintPage[4] into CRG_OVERRIDEPage [4].

If the value of CRG_OVERRIDE [m] is 1 (YES in step S412), in step S1303, the CPU 12 determines whether the value of CRG_PrintPage[m] is larger than the value of CRG_OVERRIDEPage[m] with a predetermined value added. In the example of FIG. 13, the predetermined value is 300.

If the value of CRG_PrintPage[m] is larger than the value of CRG_OVERRIDEPage[m] with the predetermined value added (YES in step S1303), the processing proceeds to step S413. If the value of CRG_PrintPage[m] is equal to or smaller than the value of CRG_OVERRIDEPage[m] with the predetermined value added (NO in step S1303), the processing proceeds to step S419.

After executing step S428, in step S1304, the CPU 12 sets 0 into each of CRG_PrintPage[s] and CRG_OVERRIDEPage[s].

According to the fourth exemplary embodiment, even when continued use of the toner cartridge has been specified, after a predetermined number of pages are printed, the toner cartridge is moved to the replacement position.

A printing apparatus according to the present invention is not limited to the laser beam printer, but may be printing apparatuses of other printing systems. Though the toner-type printing apparatus has been described above, the present invention can be applied to printing apparatuses using printing materials, such as ink or toner.

Moving a storing unit configured to store a recording material to a position where the recording material is supplied to the printing apparatus includes moving a toner cartridge, an ink cartridge or an ink tank to a position where they can be replaced with new ones. The above expression further includes moving the toner cartridge to a position where the toner cartridge can be refilled with the toner and moving the ink cartridge to a position where the ink cartridge can be refilled with the ink.

In the above-described exemplary embodiments, the CPU 12 executes the program based on the flowcharts in FIGS. 4, 5, 10, 11, and 13. However, instead of the CPU 12, a control circuit may be used, which is designed to execute a control method based on the flowcharts in FIGS. 4, 5, 10, 11, and 12.

According to the present invention, the user can select whether to move a storing unit determined to have run out of a recording material to a position where the recording material can be supplied. The printing apparatus can select whether to move the storing unit determined to have run out of the recording material to the position where the recording material can be supplied.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-159012 filed Jul. 20, 2011, which is hereby incorporated by reference herein in its entirety.

What is claimed is:

1. A printing apparatus configured to perform printing by using a recording materiel, comprising:

a storing unit configured to store recording material;

a moving unit configured to move a storing unit determined to run low on or run out of a recording material to a position where a recording material is supplied to the printing apparatus; and a setting unit configured to, according to an instruction from a user, set continued use of the storing unit determined to run low on or run out of the recording material, wherein the moving unit does not move the storing unit to the position even when the storing unit is determined to run low or run out of the recording material if continued use of the storing unit determined to run low on or run out of the recording material is set.

2. The printing apparatus according to claim 1, wherein the moving unit moves the storing unit to the position according to an instruction to move the storing unit to the position even if continued use of the storing unit determined to run low on or run out of the recording material is set.

3. The printing apparatus according to claim 1, further comprising:

a selecting unit configured to select whether to move a first storing unit determined to run low on or run out of the recording material to the position when a second storing unit different from the first storing unit is determined to run low on or run out of the recording material, wherein when moving the first storing unit to the position is selected and the second storing unit is determined to run low on or run out of the recording material, the moving unit moves both the first storing unit and the second storing unit to the position.

4. The printing apparatus according to claim 3, wherein when moving the first storing unit to the position is not selected and the second storing unit is determined to run low on or run out of the recording material, the moving unit does not move the first storing unit to the position, but moves the second storing unit to the position.

5. The printing apparatus according to claim 1, wherein after continued use of the storing unit determined to run low on or run out of the recording material is set, when a number of pages printed by using the storing unit reaches a predetermined number, the moving unit moves the storing unit to the position.

6. The printing apparatus according to claim 1, wherein the recording material is toner and the storing unit is a toner cartridge.

7. The printing apparatus according to claim 1, wherein the moving unit rotates a plurality of storing units and moves a storing unit determined to run low on or run out of the recording material to the position.

8. The printing apparatus according to claim 1, wherein supplying the recording material to the printing apparatus includes replacing the storing unit.

9. The printing apparatus according to claim 1, wherein supplying the recording material to the printing apparatus includes refilling the storing unit with the recording material.

10. The printing apparatus according to claim 1, wherein the position where the recording material is supplied to the printing apparatus is a position corresponding to an opening or closing of a cover.

11. The printing apparatus according to claim 1, further comprising a memory unit configured to store information indicating whether each of a plurality of storing units is determined to run low on or run out of the recording material and information indicating whether to continue to use each of the plurality of storing units.

12. The printing apparatus according to claim 1, further comprising:

a receiving unit configured to receive the instruction from the user through an external computer.

13. The Printing apparatus according to claim 1, wherein the moving unit moves the storing unit determined to run low on or run old of the recording material, according to a determination that the storing unit runs low on or runs out of the recording material.

14. The printing apparatus according to claim 13, wherein, after printing is started, the moving unit moves the storing unit determined to run low on or run out of the recording material, according to the determination that the storing unit runs low on or runs out of the recording material.

15. The printing apparatus according to claim 1, wherein the moving unit moves the storing unit to the position according to a determination that another storing unit runs low on or runs out of recording material even if continued use of the storing unit is set.

16. A control method for controlling a printing apparatus that performs printing by using a recording material stored in a storing unit, comprising:

moving the storing unit determined to run low on or run out of the recording material to a position where a recording material is supplied to the printing apparatus; and setting, according to an instruction from a user, continued use of the storing unit determined to run low on or run out of the recording material, wherein the storing unit is not moved to the position even when the storing unit is determined to run low on or run out of the recording material if continued use of the storing unit determined to run low or run out of the recording material is set.

17. A non-transitory computer readable storage medium storing computer-readable instructions causing a computer of a printing apparatus that includes a storing unit configured to store a recording material and performs printing by using the recording material, to execute a method, the method comprising:

moving a storing unit determined to run low on or run out of the recording material to a position where a recording material is supplied to the printing apparatus; and setting, according to an instruction from a user, continued use of the storing unit determined to run low on or run out of the recording material, wherein the storing unit is not moved to the position even when the storing unit is determined to run low or run out of the recording material, if continued use of the storing unit determined to run low on or run out of the recording material is set.

* * * * *